United States Patent [19]
Foster et al.

[11] 3,867,113
[45] Feb. 18, 1975

[54] ETHYLENE OXIDE PROCESS

[75] Inventors: E. Gordon Foster; Paul F. Russell; Robert G. Vanderwater, all of Houston, Tex.

[73] Assignee: Shell Oil Company, Houston, Tex.

[22] Filed: July 16, 1973

[21] Appl. No.: 379,276

[52] U.S. Cl. .................................. 55/44, 55/68
[51] Int. Cl. ............................................ B01d 53/14
[58] Field of Search ............. 55/48, 51, 68, 73, 93, 55/94, 44

[56] References Cited
UNITED STATES PATENTS

| | | | |
|---|---|---|---|
| 3,362,133 | 1/1968 | Kutsher et al. | 55/48 |
| 3,375,639 | 4/1968 | Miller et al. | 55/48 |
| 3,463,603 | 8/1969 | Freitas et al. | 55/68 |
| 3,710,546 | 1/1973 | Grunewald et al. | 55/73 |
| 3,766,714 | 10/1973 | Cunningham et al. | 55/48 |
| 3,770,622 | 11/1973 | Freireich et al. | 55/73 |

*Primary Examiner*—Charles N. Hart
*Attorney, Agent, or Firm*—Ronald R. Reper

[57] ABSTRACT

A process for separating carbon dioxide from a gaseous recycle system containing ethylene unconverted in the catalytic oxidation of ethylene to ethylene oxide comprises (a) contacting at least a portion of the total recycle stream with an aqueous absorbant for carbon dioxide thereby producing a hydrocarbon rich overhead and a carbon dioxide-fat absorbate, (b) flashing the fat absorbate to produce a hydrocarbon-rich inert vapor stream and a hydrocarbon-lean, carbon dioxide-fat absorbate and (c) stripping the hydrocarbon-lean, carbon dioxide-fat absorbate to produce a carbon dioxide overhead substantially free of hydrocarbon.

4 Claims, 1 Drawing Figure

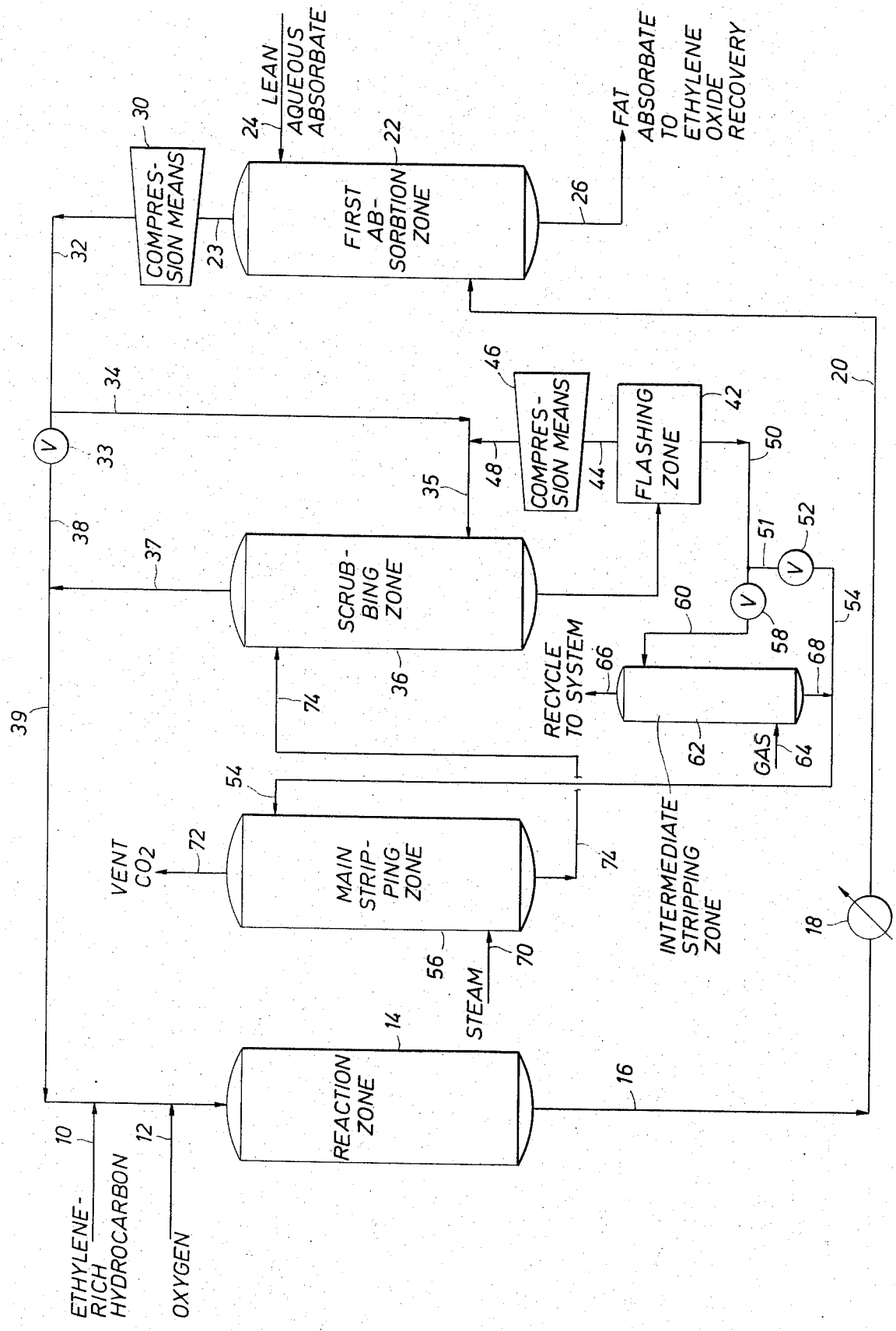

ETHYLENE OXIDE PROCESS

BACKGROUND OF THE INVENTION

This invention relates to separation of carbon dioxide from a gaseous hydrocarbon stream containing ethylene. More particularly, it deals with recovering hydrocarbons dissolved or entrained during conventional carbon dioxide scrubbing, in order to facilitate economic utilization of said hydrocarbons and to substantially avoid vending of said hydrocarbons to the atmosphere. Specifically, a processing sequence is disclosed which permits improved hydrocarbon utilization in an ethylene oxide process while substantially reducing venting of small amounts of hydrocarbon.

THE PRIOR ART

Ethylene oxide is a substantial item of chemical commerce having utility both as a sterilization agent and as a fumigant, but primarily as a starting material in the manufacture of a diversity of products such as antifreeze, cosmetics, lubricants, plastics and surfactants. The major process for manufacture of ethylene oxide is by the silver-catalyzed oxidation of ethylene. Typically, the reaction products comprise small quantities of ethylene oxide together with large amounts of unconverted ethylene and oxygen as well as appreciable quantities of carbon dioxide, low molecular weight hydrocarbons and inert gases such as nitrogen. Customarily, the ethylene oxide product is recovered by absorption in water followed by processing of the ethylene oxide-fat absorbate in a variety of ways including fractionation, scrubbing, stripping and the like. Exemplary processes are described, e.g., in U.S. Pat. applications Ser. No. 185,987 and Ser. No. 105,205. Except for a small vent, the residual gases after removal of the ethylene oxide are compressed and recycled. A side stream of the recycle gas is scrubbed with a suitable absorbant for removal of excess carbon dioxide. The carbon dioxide is subsequently stripped from the absorbant and typically is vented, or if desired, recovered for use or sale as a by-product.

A problem arises particularly in manufacturing plants of large capacity, in that during scrubbing of the recycle gas small amounts of hydrocarbon are dissolved and/or entrained in the absorbant and ultimately vented with the carbon dioxide. It would be highly desirable if recovery of these hydrocarbons could be efficiently accomplished both to enhance overall efficiency of the ethylene oxide process and to substantially prevent release of these hydrocarbons to the environment. Moreover, when recovery of the carbon dioxide is desired, reduction of the hydrocarbon impurities may be important for some applications.

BRIEF SUMMARY OF THE INVENTION

It has now been found that, in the separation of carbon dioxide from a gaseous mixture of oxygen and $C_1$-$C_2$ hydrocarbon unconverted in the partial oxidation of hydrocarbon to ethylene oxide, hydrocarbons dissolved and/or entrained in the scrubbing zone may be recovered and the overall yield of ethylene oxide increased by (a) contacting at least a portion of the total recycle hydrocarbon stream with an aqueous carbon dioxide absorbant in a scrubbing zone thereby producing a hydrocarbon-rich overhead and a carbon dioxide-fat absorbate containing hydrocarbon, (b) flashing the carbon dioxide-fat absorbate to produce a hydrocarbon-containing vapor stream and a hydrocarbon-lean, carbon dioxide-fat absorbate and (c) stripping the hydrocarbon-lean, carbon dioxide-fat absorbate in a stripping zone to produce a carbon dioxide stream substantially free of hydrocarbon.

BRIEF DESCRIPTION OF THE DRAWING

The invention is also described with reference to the accompanying drawing which discloses a preferred embodiment of this invention. Shown in the drawing are a partial oxidation zone for converting ethylene to ethylene oxide; a first absorbtion zone for recovering ethylene oxide from the reaction zone effluent; compression means to recycle non-absorbed gases to the reaction zone; a scrubbing zone (second absorbtion zone) to absorb carbon dioxide from at least a portion of the recycled gases, a flashing zone to substantially separate hydrocarbon entrained and dissolved in the carbon dioxide-fat absorbate from the scrubbing zone; a main stripping zone to separate hydrocarbon-free carbon dioxide; and their interconnections. Also shown is an alternative embodiment wherein between the flashing zone and the main stripping zone is an intermediate stripping zone to further separate trace hydrocarbon not removed from the carbon dioxide-fat absorbate in the flashing zone.

Of necessity, certain limitations must be present in a schematic diagram of the type presented and no intention is made thereby to limit the generally broad scope of this invention to specific feedstock, flow rates, catalysts, etc. Miscellaneous appurtenances including valves, controllers, pumps, and compressors have been eliminated and only those vessels and lines necessary for a complete and clear understanding of this invention are shown.

DETAILED DESCRIPTION OF THE INVENTION

With reference to the attached schematic diagram, an ethylene-rich gaseous $C_1$-$C_2$ hydrocarbon stream (10) from a source not shown is combined with recycle gases flowing through conduit 39 and admixed with an oxygen-containing (e.g., oxygen, air or a mixture thereof) stream 12 from a source not shown and contacted in oxidation reaction zone 14 with an oxidation catalyst of conventional design such as e.g., a silver-containing catalyst. The gaseous hydrocarbon stream 10 will be acetylene free since, even in trace amounts, acetylene is both deleterious and hazardous during the oxidation step. As will be obvious to those skilled in the art, the reaction zone may comprise a plurality of reactors (not shown) arrayed in series or parallel flow. In the reaction zone a portion of the ethylene is partially oxidized to ethylene oxide. Heat released during the partial oxidation step may be controlled and/or recovered by conventional heat exchange means with the reactor contents to maintain desired conversion conditions.

The effluent from the reaction zone 14 typically has a composition comprising about 0.5 to about 3% mole ethylene oxide, up to about 35% mole ethylene, up to about 8% mole oxygen, from about 0.5 to about 20% mole carbon dioxide and amounts of other $C_1$-$C_2$ hydrocarbon as well as inerts such as nitrogen and argon. The effluent from the reaction zone 14 emanates via conduit 16 at a temperature in the range from about 400° to about 550°F and generally at a pressure in the range from about 150 to about 350 psig and is cooled to a temperature from about 100°F to about 200°F by indirect heat exchange means 18. In a commercial embodiment heat exchange means 18 typically comprises one or a plurality of heat exchange zones. The cooled reaction product is passed via conduit 20 to first absorbtion zone 22. In first absorbtion zone the cooled reactor effluent is contacted with a lean aqueous stream 24, typically water, to absorb and separate ethylene oxide from unreacted ethylene and other $C_1$–$C_2$ hydrocarbons, carbon dioxide and oxygen as well as a majority of other gaseous components. Suitable absorbtion conditions are temperatures from about 60° to 120°F and pressures from about 100 to about 300 psig. The aqueous absorbate which contains ethylene oxide in dilute concentration is passed via conduit 26 to further processing for, e.g., recovery of ethylene oxide or if desired for chemical conversion to derivatives such as glycols, ethers, amines and the like. The unabsorbed gaseous materials are passed via conduit 28 to compression means 30 and via conduit 32 for further treatment and ultimate recycle to the reactor. Compression means 30 could be located elsewhere in the recycle loop, such as in conduit 20 or conduit 39, if desired. At least a portion of the unabsorbed gaseous materials in conduit 32 are passed via conduits 34 and 35 to scrubbing zone 36 where they are contacted with a regenerable carbon dioxide absorbant introduced via conduit 74. The amount of recycle gases passed to scrubbing zone 36 may be controlled by any conventional valve means 33 and will ordinarily lie in the range from about 10 to about 50% by weight of the total recycle gases. Exemplary absorbants for carbon dioxide include aqueous solutions of alkali metal carbonates such as potassium carbonate, alkanol amines such as diisopropanol amine, alkyl alkanol amines and alkali metal salts of amino acids. Absorbtion conditions will vary depending upon the particular absorbant employed; however, generally temperature from about 100° to about 250°F and pressures from about 150 to about 350 psig may be used. From scrubbing (carbon dioxide absorbtion) zone 36, the treated carbon dioxide-lean gas is passed as overhead via conduits 37 and 39 to reaction zone 14. The carbon dioxide-fat absorbate containing small amounts of entrained and/or dissolved hydrocarbon is passed from scrubbing zone 36 via conduit 40 to flashing zone 42. The hydrocarbon contained in the carbon dioxide-fat absorbate is flashed in flashing zone 42 at a temperature of from about 210° to about 245°F and a pressure of from about 30 to about 100 psig and the flashing zone gaseous overhead is passed via conduit 44 for recovery in the system. The drawing illustrates a preferred embodiment wherein the flashing zone gaseous overhead fraction is returned to the recycle gas flowing in conduit 39 via compression means 46, conduits 48 and 35, scrubbing zone 36 and conduit 37. However, the amount of flashing zone overhead is typically very small and may be returned to the recycle gas stream at any desired location such as, e.g., to the first absorbtion zone 22 via a conduit (not shown); or alternatively via a conduit (not shown) directly to conduit 39 which returns the principal recycle gas to reaction zone 14. It is also possible to otherwise utilize the flashing zone overhead fraction, e.g., as fuel gas. The flashed carbon dioxide-fat absorbate liquid is withdrawn from flashing zone 42 via conduit 50 to main stripping zone 56.

The drawing further illustrates an alternative embodiment wherein the flashed, carbon dioxide-fat absorbate is contacted with a stripping gas in an intermediate stripping zone to separate essentially all hydrocarbon as may remain therein. In accordance with the alternative embodiment valve means 52 located on conduit 51 and valve means 58 located on conduit 50 are installed to direct at least a portion and preferably all of the carbon dioxide-fat absorbate via conduit 60 to intermediate stripping zone 62 where it is contacted with an inert stripping gas such as nitrogen, carbon dioxide, steam and the like introduced via conduit 64. Air may also be used as a stripping gas since generally only very small amounts of gas need be employed. The pressure in the intermediate stripping zone may vary from about 20 to about 55 psia, however, will ordinarily be maintained at a pressure slightly lower than that of the flashing zone. The intermediate stripper gaseous overhead fraction removed contains substantially all hydrocarbons as may remain in the carbon dioxide-fat absorbate introduced into said intermediate stripper 62. The intermediate stripper overhead fraction removed via conduit 66 may be combined with recycle gas via means not shown, however, will ordinarily contain only trace amounts of hydrocarbon and more practicably will be dispersed into fuel gas or otherwise combusted. The carbon dioxide-fat absorbate from intermediate stripping zone 62 is passed via conduits 68 and 54 to main stripping zone 56, where carbon dioxide is stripped from the aqueous absorbate, typically at pressures from about 0.15 to about 15 psig. Steam can be introduced into main stripping zone 56 via conduit 70 to facilitate stripping. Alternatively, heating coils, a reboiler or the like (not shown) can be provided to heat and volatilize the aqueous absorbant and thereby provide stripping. When stripping steam is employed, the overhead passing from the main stripping zone 56 via conduit 72 will ordinarily be cooled by heat exchange means (not shown) to condense at least a portion of the steam vapors contained therein for recovery and possible reuse of the condensate. The carbon dioxide which is stripped from the aqueous absorbant is essentially hydrocarbon-free and may be recovered and utilized as such or vented via conduit 72 without adverse environmental impact. The main stripping zone liquid bottoms stream containing carbon dioxide-lean absorbate is passed via conduit 74 to second absorbtion zone (carbon dioxide scrubbing zone) 36 for contact with recycle gas entering via conduit 35.

Illustrative Embodiment

In a typical procedure recycle gas effluent from the ethylene oxide absorber containing about 5–15% by weight carbon dioxide, about 65–75% $C_1$–$C_2$ hydrocarbons, 3–8% oxygen and balance of inert gases such as, e.g., nitrogen and argon, as well as water vapor, is processed according to the present invention. About 25% by volume of the gas is contacted with an aqueous solution of potassium carbonate as absorbant for the carbon dioxide. With reference to the drawing, approximate pressures and temperatures maintained in the carbon dioxide scrubber 36, flashing zone 42 and main stripping zone 56 are shown in Table I.

Table I

| Zone | Top Temp. °F | Top Pressure Psig |
|---|---|---|
| Scrubbing Zone 36 | 230 | 310 |
| Flashing Zone 42 | 225 | 30 |
| Main Stripping Zone 56 | 230 | 2 |

Compositions of the various streams are shown in Table II.

Table II

| Stream | 40 | 44 | 74 | 72 |
|---|---|---|---|---|
| Flow, Moles/unit of time basis 100 moles recycle stream 32 | 140 | 0.07 | 145 | 1.7* |
| Composition, %w | | | | |
| $C_1$-$C_2$ hydrocarbon | 0.05 | 35 | — | contains less than about 10% of total amount in 40 |
| $CO_2$ | — | 40 | — | 92+* |
| Water/aqueous potassium carbonates | 98.5+ | 20 | 98.5 | 7+* |
| Inert and oxygenated products | 1+ | 5 | 1.5 | Tr * |

*Composition will vary dependent upon degree of condensation applied to recover stripping steam.

What is claimed is:

1. A process for separating an essentially hydrocarbon-free carbon dioxide stream from a recycle stream containing $C_{1-2}$ hydrocarbons in the partial oxidation of ethylene to ethylene oxide, wherein the hydrocarbons entrained and/or dissolved with the carbon dioxide stream are recovered which process comprises
   a. contacting at least a portion of the total recycle hydrocarbon stream with a carbon dioxide absorbing aqueous liquid in a scrubbing zone, thereby producing a hydrocarbon-rich overhead and a carbon dioxide-fat absorbate containing some hydrocarbon,
   b. flashing said fat absorbate in a flashing zone to produce a hydrocarbon-containing vapor stream and a hydrocarbon-lean, carbon dioxide-fat absorbate,
   c. contacting at least a portion of the hydrocarbon-lean, carbon dioxide-fat absorbate in an intermediate stripping zone with steam or an inert gas to produce a hydrocarbon-containing overhead vapor stream and a substantially hydrocarbon-free, carbon dioxide-fat absorbate, and
   d. combining any hydrocarbon-lean, carbon dioxide fat absorbate and the substantially hydrocarbon-free absorbate streams in a stripping zone to produce a carbon dioxide overhead steam substantially free of hydrocarbons.

2. A process as in claim 1 wherein the pressure and temperature in the flashing zone are from about 20 to about 100 psig and from about 100°F to about 245°F, respectively.

3. A process as in claim 1 wherein the pressure in the intermediate stripping zone is from about 5 to about 40 psig.

4. A process as in claim 1 wherein the carbon dioxide absorbing aqueous liquid is a potassium carbonate solution.

* * * * *